US011269187B2

(12) United States Patent
Tanaka et al.

(10) Patent No.: US 11,269,187 B2
(45) Date of Patent: Mar. 8, 2022

(54) DISPLAY DEVICE AND DISPLAY METHOD

(71) Applicant: SEIKO EPSON CORPORATION, Tokyo (JP)

(72) Inventors: Hideki Tanaka, Chino (JP); Yuya Maruyama, Fuefuki (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/919,882

(22) Filed: Jul. 2, 2020

(65) Prior Publication Data

US 2021/0003847 A1 Jan. 7, 2021

(30) Foreign Application Priority Data

Jul. 3, 2019 (JP) .............................. JP2019-124303

(51) Int. Cl.
*G02B 27/01* (2006.01)
*G06T 7/70* (2017.01)

(52) U.S. Cl.
CPC ............ *G02B 27/0172* (2013.01); *G06T 7/70* (2017.01); *G02B 2027/014* (2013.01); *G02B 2027/0138* (2013.01); *G02B 2027/0178* (2013.01)

(58) Field of Classification Search
CPC ........ G02B 27/0172; G02B 2027/0138; G02B 2027/014; G02B 2027/0178; G02B 2027/0134; G06T 7/70
See application file for complete search history.

(56) References Cited

U.S. PATENT DOCUMENTS

| | | |
|---|---|---|
| 2006/0044327 A1 | 3/2006 | Okuno et al. |
| 2009/0102845 A1 | 4/2009 | Takemoto et al. |
| 2015/0363979 A1 | 12/2015 | Takano et al. |
| 2017/0109934 A1* | 4/2017 | Hasegawa ............... G06T 17/00 |

FOREIGN PATENT DOCUMENTS

| | | |
|---|---|---|
| JP | 2005-346468 A | 12/2005 |
| JP | 2009-104249 A | 5/2009 |
| JP | 2017-076295 A | 4/2017 |
| JP | 6264855 B2 | 1/2018 |

* cited by examiner

*Primary Examiner* — Alexander Eisen
*Assistant Examiner* — Kebede T Teshome
(74) *Attorney, Agent, or Firm* — Oliff PLC

(57) ABSTRACT

A first object present in the visual field of a user is detected together with the position of the first object. A virtual image linked with the first object in advance is displayed together with the first object. A second object operable by the user is detected together with the position of the second object. When an overlapping positional relation viewed from the user between the first object and the second object is a first positional relation, a display form of the virtual image is differentiated from a display from in a second positional relation different from the first positional relation. Consequently, it is possible to perform flexible display.

9 Claims, 13 Drawing Sheets

DISPLAY DEVICE AND DISPLAY METHOD

The present application is based on, and claims priority from JP Application Serial Number 2019-124303, filed Jul. 3, 2019, the disclosure of which is hereby incorporated by reference herein in its entirety.

BACKGROUND

1. Technical Field

The present disclosure relates to a technique for displaying a virtual image in a visual field

2. Related Art

In recent years, various display devices that display a virtual image in the visual field of a user such as an HMD have been proposed. In such display devices, a virtual image is linked with an actually existing object in advance. When the user views this object using, for example, the HMD, an image prepared in advance is superimposed and displayed on a part or the entire object or displayed near the object (see, for example, Japanese Patent No. 6264855 (Patent Literature 1)).

Such display devices are useful in that, when a surgical operation is performed, information necessary for the surgical operation can be superimposed on a human body as an image or, in manufacturing and maintenance of a machine and an apparatus, information necessary for work can be superimposed on a component and a product as an image. In such display devices, when a virtual image is linked with a real object and displayed, a desirable display form of another object, with which the virtual image is not linked, such as a surgical instrument or a tool or a user's hand or the like and the virtual image has been further improved.

SUMMARY

The present disclosure can be implemented as a display device that displays an image in a visual field of a user who is capable of visually recognizing an outside scene. The display device includes: a first detecting section configured to detect a first object present in the visual field of the user together with a position of the first object; a second detecting section configured to detect a second object operable by the user together with a position of the second object; and a display changing section configured to superimpose and display, on the first object, a virtual image linked with the first object in advance and, when an overlapping positional relation viewed from the user between the first object and the second object is a first positional relation, differentiate a display form of the virtual image from a display from in a second positional relation different from the first positional relation.

DESCRIPTION OF EXEMPLARY EMBODIMENTS

A. First Embodiment

A-1. Overall Configuration of an HMD

Figure 1:
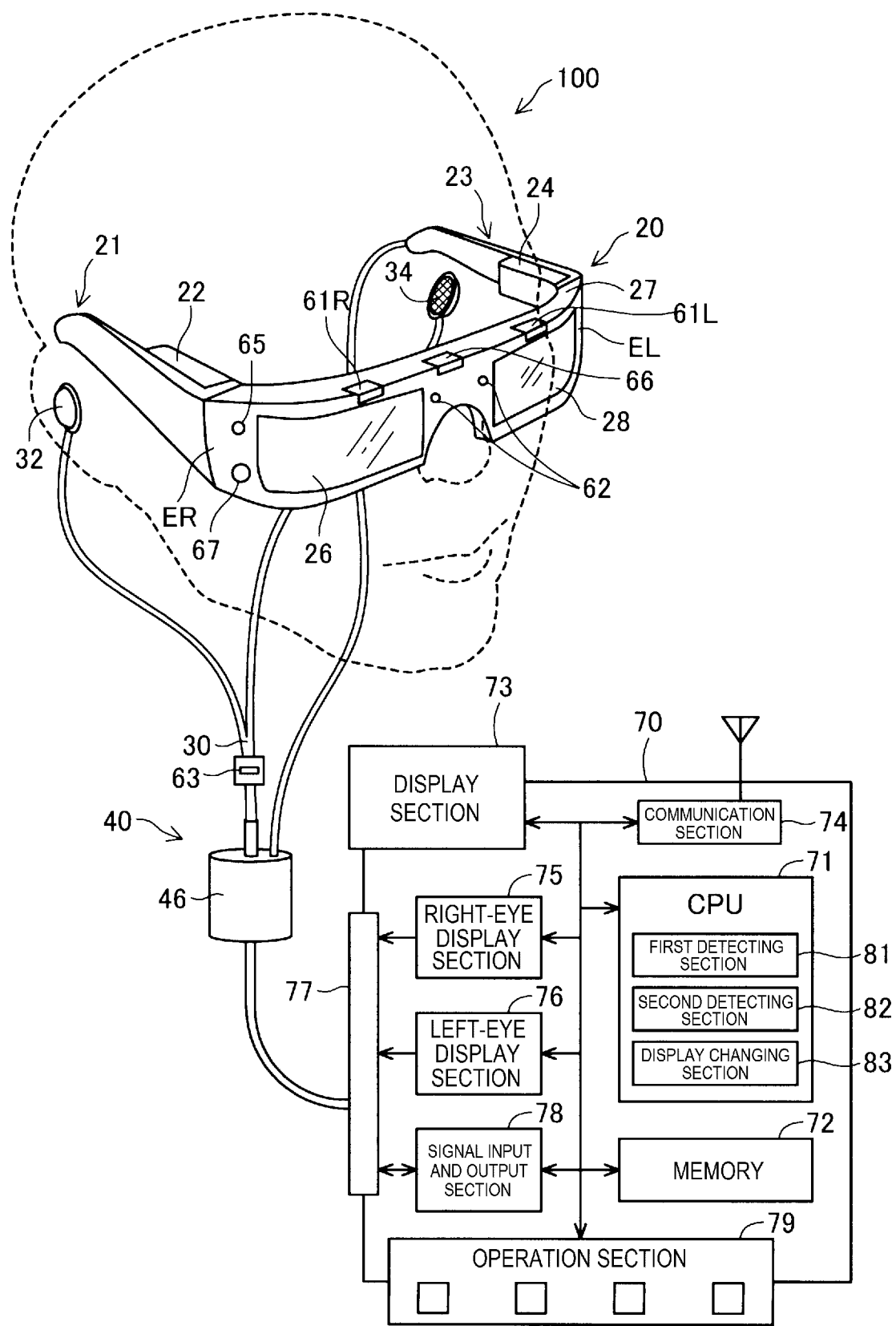
FIG. 1 is an explanatory diagram illustrating an exterior configuration of an HMD in a first embodiment.

FIG. 1 is a diagram illustrating an exterior configuration of an HMD (Heard Mounted Display) 100 in a first embodiment of the present disclosure. The HMD 100 is a display device including an image display section 20 (a display section) configured to cause a user to visually recognize a virtual image in a state worn on the user's head and a control device 70 (a control section) configured to control the image display section 20. The control device 70 exchanges signals with the image display section 20 and performs control necessary for causing the image display section 20 to display an image.

The image display section 20 is a wearing body worn on the user's head. In this embodiment, the image display section 20 has an eyeglass shape. The image display section 20 includes a right display unit 22, a left display unit 24, a right light guide plate 26, and a left light guide plate 28 in a main body including a right holding section 21, a left holding section 23, and a front frame 27.

The right holding section 21 and the left holding section 23 respectively extend backward from both end portions of the front frame 27 and, like temples of eyeglasses, hold the image display section 20 on the user's head. Of both the end portions of the front frame 27, an end portion located on the right side of the user in the worn state of the image display section 20 is represented as an end portion ER and an end portion located on the left side of the user in the worn state of the image display section 20 is represented as an end portion EL. The right holding section 21 is provided to extend from the end portion ER of the front frame 27 to a position corresponding to the right temporal region of the user in the worn state of the image display section 20. The left holding section 23 is provided to extend from the end portion EL of the front frame 27 to a position corresponding to the left temporal region of the user in the worn state of the image display section 20.

The right light guide plate 26 and the left light guide plate 28 are provided in the front frame 27. The right light guide plate 26 is located in front of the right eye of the user in the worn state of the image display section 20 and causes the right eye to visually recognize an image. The left light guide plate 28 is located in front of the left eye of the user in the worn state of the image display section 20 and causes the left eye to visually recognize the image.

The front frame 27 has a shape obtained by coupling one end of the right light guide plate 26 and one end of the left light guide plate 28. The position of the coupling corresponds to the position of the middle of the eyebrows of the user in the worn state of the image display section 20. In the front frame 27, a nose pad section in contact with the nose of the user in the worn state of the image display section 20 may be provided in the coupling position of the right light guide plate 26 and the left light guide plate 28. In this case, the image display section 20 can be held on the user's head by the nose pad section and the right holding section 21 and the left holding section 23. A belt in contact with the back of the user's head in the worn state of the image display section 20 may be coupled to the right holding section 21 and the left holding section 23. In this case, the image display section 20 can be firmly held on the user's head with the belt.

The right display unit 22 performs image display by the right light guide plate 26. The right display unit 22 is provided in the right holding section 21 and located near the right temporal region of the user in the worn state of the image display section 20. The left display unit 24 performs image display by the left light guide plate 28. The left display unit 24 is provided in the left holding section 23 and located near the left temporal region of the user in the worn state of the image display section 20.

The right light guide plate 26 and the left light guide plate 28 in this embodiment are optical sections (for example, prisms or holograms) formed of light transmissive resin or the like and guide image lights output by the right display unit 22 and the left display unit 24 to the eyes of the user. Dimming plates may be provided on the surfaces of the right light guide plate 26 and the left light guide plate 28. The dimming plates are thin plate-like optical elements having different transmittance according to a wavelength region of light and function as so-called wavelength filters. For example, the dimming plates are disposed to cover the surface (the surface on the opposite side of the surface opposed to the eyes of the user) of the front frame 27. By selecting an optical characteristic of the dimming plates as appropriate, it is possible to adjust the transmittance of light in any wavelength region such as visible light, infrared light, and ultraviolet light. It is possible to adjust a light amount of external light made incident on the right light guide plate 26 and the left light guide plate 28 from the outside and transmitted through the right light guide plate 26 and the left light guide plate 28.

The image display section 20 guides image lights respectively generated by the right display unit 22 and the left display unit 24 to the right light guide plate 26 and the left light guide plate 28 and causes the user to visually recognize a virtual image with the image lights (this is referred to as "display an image" as well). When the external light is transmitted through the right light guide plate 26 and the left light guide plate 28 from the front of the user and made incident on the eyes of the user, the image lights forming the virtual image and the external light are made incident on the eyes of the user. Accordingly, the visibility of the virtual image in the user is affected by the intensity of the external light.

Accordingly, for example, by mounting the dimming plates on the front frame 27 and selecting or adjusting the optical characteristic of the dimming plates as appropriate, it is possible to adjust easiness in visually recognizing the virtual image. In a typical example, it is possible to select dimming plates having light transmissivity enough for the user wearing the HMD 100 to at least visually recognize an outside scene. When the dimming plates are used, it is possible to expect effects of protecting the right light guide plate 26 and the left light guide plate 28 and suppressing damage, soil adhesion, and the like to the right light guide plate 26 and the left light guide plate 28. The dimming plates may be detachably attachable to the front frame 27 or each of the right light guide plate 26 and the left light guide plate 28. A plurality of types of dimming plates may be exchangeable and detachably attachable or the dimming plates may be omitted.

Besides the members relating to the image display explained above, two cameras 61R and 61L, an inner camera 62, an illuminance sensor 65, a six-axis sensor 66, and an indicator 67 are provided in the image display section 20. The two cameras 61R and 61L are disposed on the upper side of the front frame 27 of the image display section 20. The two cameras 61R and 61L are provided in positions substantially corresponding to both the eyes of the user and are capable of performing measurement of the distance to a target object by so-called binocular vision. The distance measurement is performed by the control device 70. The cameras 61R and 61L may be provided anywhere in a position where the distance measurement by the binocular vision can be performed. The cameras 61R and 61L may be respectively disposed at the end portions ER and EL of the front frame 27. The measurement of the distance to the target object can also be realized by, for example, a configuration in which the measurement is performed by a monocular camera and an analysis of an image photographed by the monocular camera or a configuration in which the measurement is performed by a millimeter wave radar.

The cameras 61R and 61L are digital cameras including imaging elements such as CCDs or CMOS and imaging lenses. The cameras 61R and 61L image at least a part of an outside scene (a real space) in the front side direction of the HMD 100, in other words, a visual field direction visually recognized by the user in the worn state of the image display section 20. In other words, the cameras 61R and 61L image a range or a direction overlapping the visual field of the user and image a direction visually recognized by the user. In this embodiment, the width of an angle of view of the cameras 61R and 61L is set to image the entire visual field of the user visually recognizable by the user through the right light guide plate 26 and the left light guide plate 28. An optical system capable of setting the width of the angle of view of the cameras 61R and 61L as appropriate may be provided.

Like the cameras 61R and 61L, the inner camera 62 is a digital camera including an imaging element such as a CCD or a CMOS and an imaging lens. The inner camera 62 images the inner side direction of the HMD 100, in other words, a direction opposed to the user in the worn state of the image display section 20. The inner camera 62 in this embodiment includes an inner camera for imaging the right eye of the user and an inner camera for imaging the left eye. In this embodiment, the width of an angle of view of the inner camera 62 is set in a range in which the entire right eye or left eye of the user can be imaged. The inner camera 62 is used to detect the positions of the eyeballs, in particular, the pupils of the user and calculate the direction of the visual line of the user from the positions of the pupils of both the eyes. It goes without saying that an optical system capable of setting the width of the angle of view may be provided in the inner camera 62. The inner camera 62 may be used to read an expression or the like of the user by imaging not only the pupils of the user but also a wider region.

The illuminance sensor 65 is provided at the end portion ER of the front frame 27 and disposed to receive external light from the front of the user wearing the image display section 20. The illuminance sensor 65 outputs a detection value corresponding to a light reception amount (light reception intensity). The LED indicator 67 is disposed at the end portion ER of the front frame 27. The LED indicator 67 is lit during execution of the imaging by the cameras 61R and 61L to inform that the imaging is being performed.

The six-axis sensor 66 is an acceleration sensor and detects movement amounts in X, Y, and Z directions (three axes) of the user's head and tilts (three axes) with respect to the X, Y, and Z directions of the user's head. In the X, Y, and Z directions, the Z direction is a direction along the gravity direction, the X direction is a direction from the back to the front of the user, and the Y direction is a direction from the left to the right of the user. The tilts of the head are angles around axes (an X axis, a Y axis, and a Z axis) in the X, Y, and Z directions. By integrating signals from the six-axis sensor 66, it is possible to learn a movement amount of the user's head from an initial position and an angle of the user's head.

The image display section 20 is coupled to the control device 70 by a connection cable 40. The connection cable 40 is drawn out from the distal end of the left holding section 23 and detachably coupled to, via a relay connector 46, a connector 77 provided in the control device 70. The connection cable 40 includes a headset 30. The headset 30 includes a microphone 63 and a right earphone 32 and a left earphone 34 worn on the right and left ears of the user. The headset 30 is coupled to the relay connector 46 and integrated with the connection cable 40.

A-2. Configuration of the Control Device

The control device 70 includes, as illustrated in FIG. 1, a right-eye display section 75, a left-eye display section 76, a signal input and output section 78, and an operation section 79 besides a CPU 71, a memory 72, a display section 73, and a communication section 74, which are well known. A predetermined OS is incorporated in the control device 70. The CPU 71 realizes various functions by executing, under control by the OS, programs stored in the memory 72. In FIG. 1, examples of the realized functions are illustrated as a first detecting section 81, a second detecting section 82, a display changing section 83, and the like in the CPU 71.

The display section 73 is a display provided in a housing of the control device 70. The display section 73 displays various kinds of information concerning display on the image display section 20. A part or all of these kinds of information can be changed by operation using the operation section 79. The communication section 74 is coupled to a communication station using a 4G or 5G communication network. Therefore, the CPU 71 is capable of accessing a network via the communication section 74 and is capable of acquiring information and images from Web sites and the like on the network. When acquiring images, information, and the like through the Internet and the like, the user can select, by operating the operation section 79, files of moving images and images that the user causes the image display section 20 to display. Alternatively, the user can also select various settings concerning the image display section 20, conditions for using the HMD 100 such as brightness of images to be displayed and an upper limit of a continuous time of use, and the like. It goes without saying that, since the user can cause the image display section 20 itself to display such information, such processing and setting are possible without the display section 73.

The signal input and output section 78 is an interface circuit that exchanges signals from the other devices excluding the right display unit 22 and the left display unit 24, that is, the cameras 61R and 61L, the inner camera 62, the illuminance sensor 65, and the indicator 67 incorporated in the image display section 20. The CPU 71 can read, via the signal input and output section 78, captured images of the cameras 61R and 61L and the inner camera 62 of the image display section 20 from the cameras 61R and 61L and the inner camera 62 and light the indicator 67.

The right-eye display section 75 outputs, with the right display unit 22, via the right light guide plate 26, an image that the right-eye display section 75 causes the right eye of the user to visually recognize. Similarly, the left-eye display section 76 outputs, with the left display unit 24, via the left light guide plate 28, an image that the left-eye display section 76 causes the left eye of the user to visually recognize. The CPU 71 calculates a position of an image that the CPU 71 causes the user to recognize, calculates a parallax of the binocular vision such that a virtual image can be seen in the position, and outputs right and left images having the parallax to the right display unit 22 and the left display unit 24 via the right-eye display section 75 and the left-eye display section 76.

Figure 2:
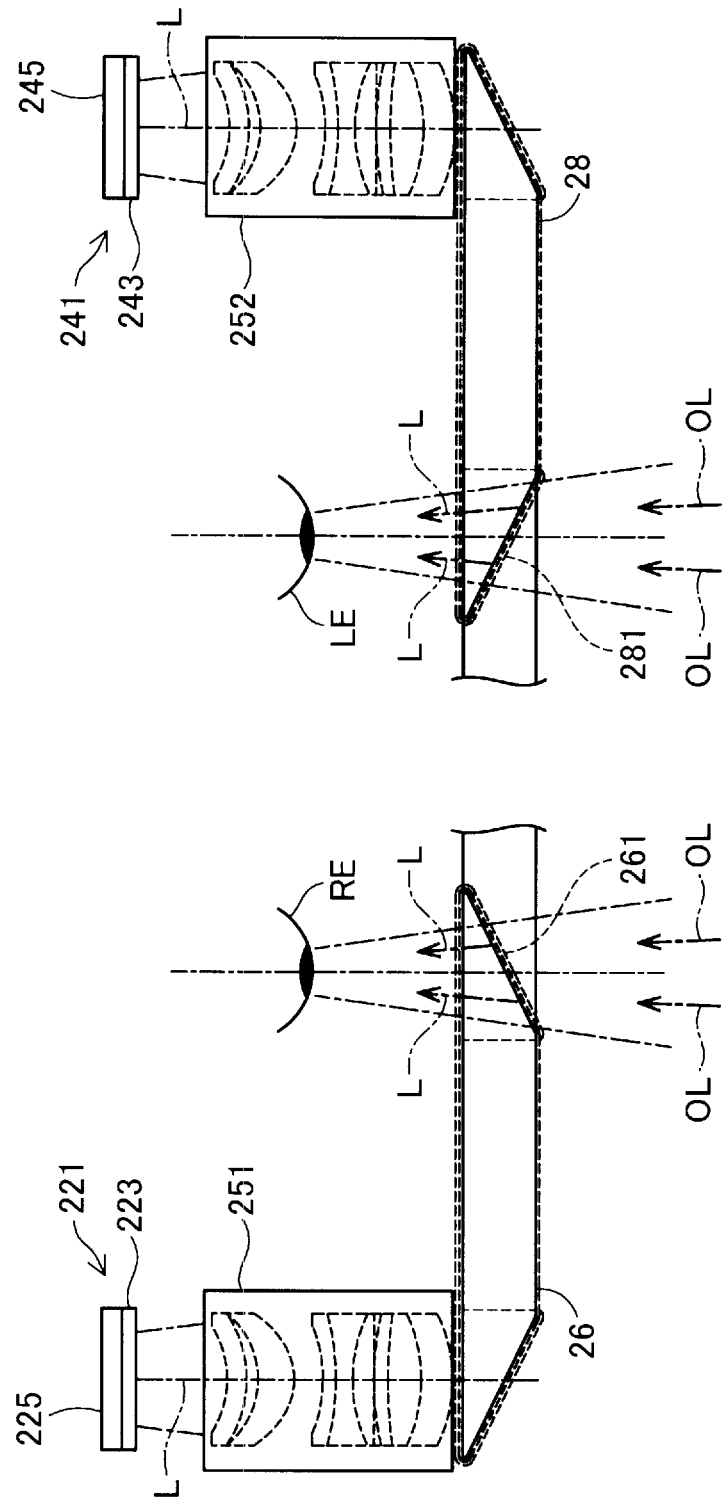
FIG. 2 is a main part plan view illustrating the configuration of an optical system included in an image display section.

An optical configuration for causing the user to recognize an image using the right display unit 22 and the left display unit 24 is explained. FIG. 2 is a main part plan view illustrating the configuration of an optical system included in the image display section 20. For convenience of explanation, a right eye RE and a left eye LE of the user are illustrated in FIG. 2. As illustrated in FIG. 2, the right display unit 22 and the left display unit 24 are symmetrically configured.

As components for causing the right eye RE to visually recognize a virtual image, the right display unit 22 functioning as a right image display section includes an OLED (Organic Light Emitting Diode) unit 221 and a right optical system 251. The OLED unit 221 emits image light L. The right optical system 251 includes a lens group and guides the image light L emitted by the OLED unit 221 to the right light guide plate 26.

The OLED unit 221 includes an OLED panel 223 and an OLED driving circuit 225 configured to drive the OLED panel 223. The OLED panel 223 is a self-emission type display panel that emits light with organic electroluminescence and is configured by light emitting elements that respectively emit color lights of R (red), G (green), and B (blue). On the OLED panel 223, a plurality of pixels, a unit of which including one each of R, G, and B elements is one pixel, are arranged in a matrix shape.

The OLED driving circuit 225 executes selection and energization of the light emitting elements included in the OLED panel 223 according to a signal sent from the right-eye display section 75 of the control device 70 and causes the light emitting elements to emit light. The OLED driving circuit 225 is fixed to the rear side of the rear surface, that is, a light emitting surface of the OLED panel 223 by bonding or the like. The OLED driving circuit 225 may be configured by, for example, a semiconductor device that drives the OLED panel 223 and mounted on a substrate fixed to the rear surface of the OLED panel 223. A temperature sensor 217 explained below is mounted on the substrate. In the OLED panel 223, a configuration in which light emitting elements that emit light in white are arranged in a matrix shape and color filters corresponding to the colors of R, G, and B are superimposed and arranged may be adopted. The OLED panel 223 having a WRGB configuration including light emitting elements that emit white (W) light in addition to the light emitting elements that respectively emit the R, G, and B lights may be adopted.

The right optical system 251 includes a collimate lens that collimates the image light L emitted from the OLED panel 223 into light beams in a parallel state. The image light L collimated into the light beams in the parallel state by the collimate lens is made incident on the right light guide plate 26. A plurality of reflection surfaces that reflect the image light L are formed in an optical path for guiding light on the inside of the right light guide plate 26. The image light L is guided to the right eye RE side through a plurality of times of reflection on the inside of the right light guide plate 26. A half mirror 261 (a reflection surface) located in front of the right eye RE is formed on the right light guide plate 26. After being reflected on the half mirror 261, the image light L is emitted from the right light guide plate 26 to the right eye RE and forms an image on the retina of the right eye RE to cause the user to visually recognize a virtual image.

As components for causing the left eye LE to visually recognize a virtual image, the left display unit 24 functioning as a left image display section includes an OLED unit 241 and a left optical system 252. The OLED unit 241 emits the image light L. The left optical system 252 includes a lens group and guides the image light L emitted by the OLED unit 241 to the left light guide plate 28. The OLED unit 241 includes an OLED panel 243 and an OLED driving circuit 245 that drives the OLED panel 243. Details of the sections are the same as the details of the OLED unit 221, the OLED panel 223, and the OLED driving circuit 225. A temperature sensor 239 is mounted on a substrate fixed to the rear surface of the OLED panel 243. Details of the left optical system 252 is the same as the details of the right optical system 251.

With the configuration explained above, the HMD 100 can function as a see-through type display device. That is, the image light L reflected on the half mirror 261 and the external light OL transmitted through the right light guide plate 26 are made incident on the right eye RE of the user. The image light L reflected on a half mirror 281 and the external light OL transmitted through the left light guide plate 28 are made incident on the left eye LE of the user. In this way, the HMD 100 superimposes the image light L of the image processed on the inside and the external light OL and makes the image light L and the external light OL incident on the eyes of the user. As a result, for the user, an outside scene (a real world) is seen through the right light guide plate 26 and the left light guide plate 28 and the virtual image by the image light L is visually recognized as overlapping the outside scene. That is, the image display section 20 of the HMD 100 transmits the outside scene to cause the user to visually recognize the outside scene in addition to the virtual image.

The half mirror 261 and the half mirror 281 reflect the image lights respectively output by the right display unit 22 and the left display unit 24 and extract images. The right optical system 251 and the right light guide plate 26 are collectively referred to as "right light guide section" as well. The left optical system 252 and the left light guide plate 28 are collectively referred to as "left light guide section" as well. The configuration of the right light guide section and the left light guide section is not limited to the example explained above. Any system can be used as long as the right light guide section and the left light guide section form a virtual image in front of the eyes of the user using the image lights. For example, in the right light guide section and the left light guide section, a diffraction grating may be used or a semi-transmissive reflection film may be used.

Figure 3:
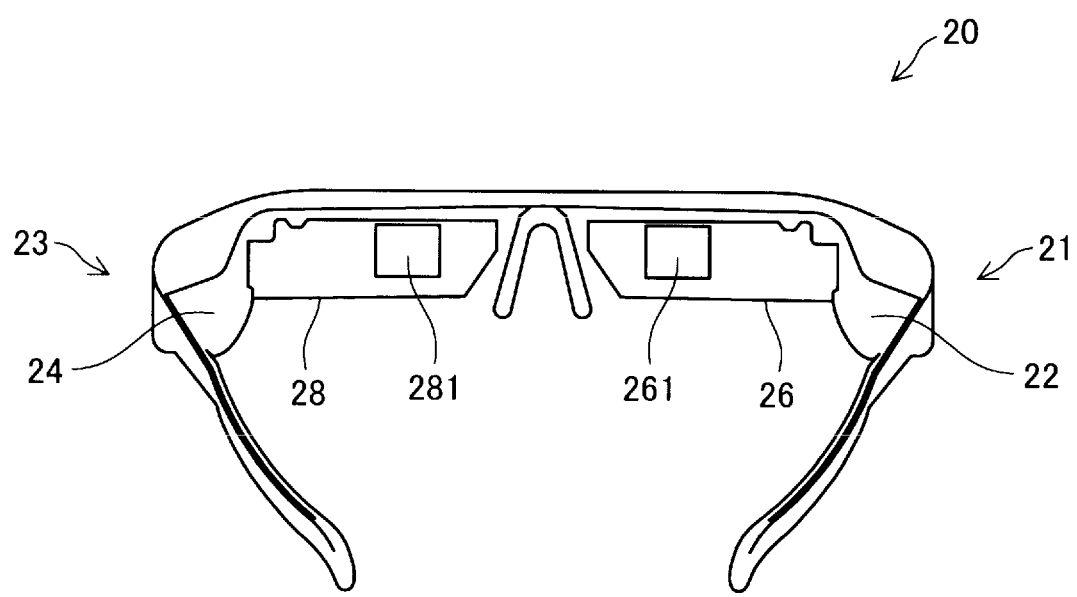
FIG. 3 is an explanatory diagram illustrating a main part configuration of the image display section viewed from a user.

FIG. 3 is a diagram illustrating a main part configuration of the image display section 20 viewed from the user. In FIG. 3, illustration of the connection cable 40, the right earphone 32, and the left earphone 34 is omitted. In a state illustrated in FIG. 3, the rear sides of the right light guide plate 26 and the left light guide plate 28 can be visually recognized. The half mirror 261 for irradiating image light on the right eye RE and the half mirror 281 for irradiating image light on the left eye LE can be visually recognized as substantially square regions. The user visually recognizes an outside scene through the entire right and left light guide plates 26 and 28 including the half mirrors 261 and 281 and visually recognizes rectangular display images in the positions of the half mirrors 261 and 281.

The user wearing the HMD 100 having the hardware configuration explained above can visually recognize an outside scene through the right light guide plate 26 and the left light guide plate 28 of the image display section 20 and can further view images formed on the panels 223 and 243 as a virtual image via the half mirrors 261 and 281. That is, the user of the HMD 100 can superimpose and view the virtual image on a real outside scene. The virtual image may be an image created by computer graphics as explained below or may be an actually captured image such as an X-ray photograph or a photograph of a component. The "virtual image" is not an image of an object actually present in an outside scene and means an image displayed by the image display section 20 to be visually recognizable by the user.

A-3. Image Display Processing

Figure 4:
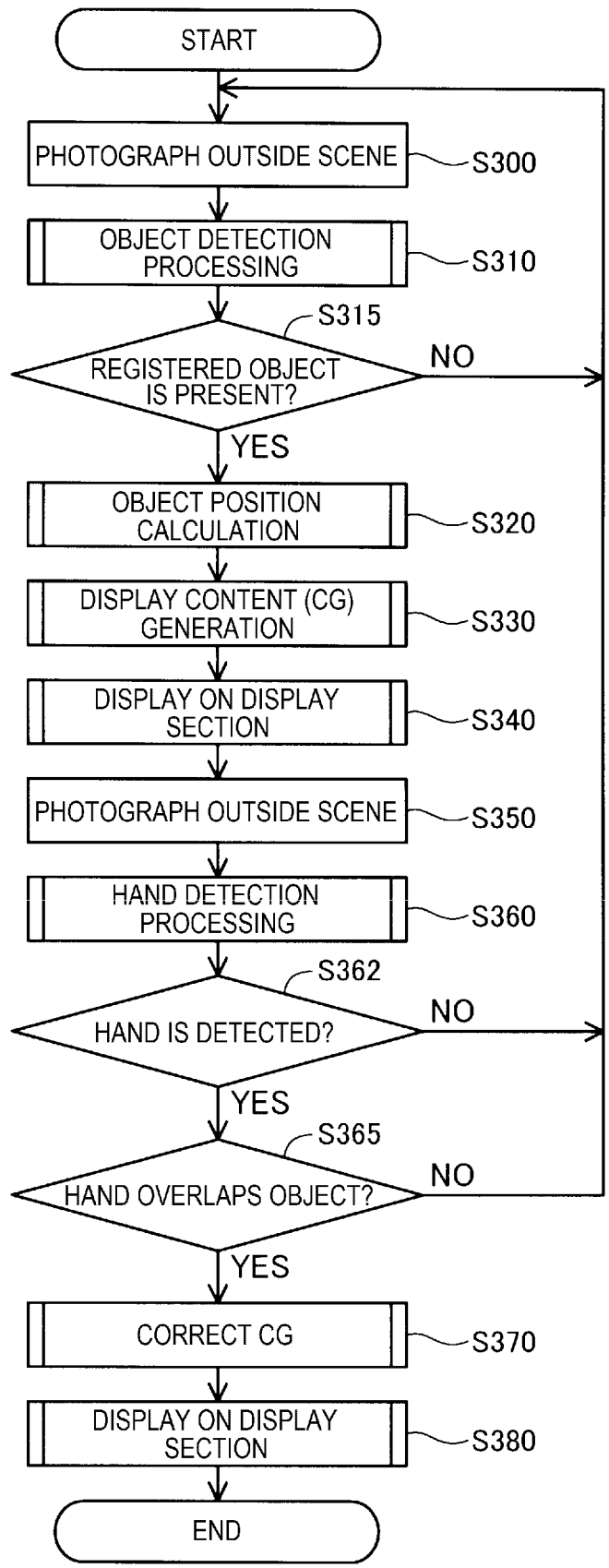
FIG. 4 is a flowchart illustrating an overview of display processing in the first embodiment.

Processing for displaying such a virtual image and appearance in that case are explained below. FIG. 4 is a flowchart illustrating processing executed by the control device 70. The processing is repeatedly executed while a power supply of the HMD 100 is on. In this embodiment, the user is a surgeon, wears the HMD 100, and, as an example, is about to perform a surgical operation for a patient's hand. This case is explained below.

When the processing illustrated in FIG. 4 is started, first, the control device 70 performs processing for photographing an outside scene with the cameras 61R and 61L (step S300).

The control device 70 captures images photographed by the cameras 61R and 61L via the signal input and output section 78. The CPU 71 performs processing for analyzing the images and detecting an object (step S310). These kinds of processing may be performed using one of the cameras 61R and 61L, that is, using an image photographed by a monocular camera. If the images photographed by the two cameras 61R and 61L disposed a predetermine distance apart are used, stereoscopic vision is possible. Object detection can be accurately performed. The object detection is performed for all objects present in the outside scene. Therefore, if a plurality of objects are present in the outside scene, the plurality of objects are detected. This processing is equivalent to detection of a first object by the first detecting section 81 of the CPU 71.

Subsequently, the control device 70 determines whether an object registered in advance is present among the detected objects (step S315). If a registered object is absent among the detected objects, the control device 70 returns to step S300 and repeats the processing from the photographing by the cameras 61R and 61L. In this embodiment, it is assumed that a patient's hand is registered in advance as the object. When determining that the patient's hand, which is the object registered in advance, is present among the objects detected in the images photographed by the cameras 61R and 61L (YES in step S315), the control device 70 performs processing for calculating a position of the object (step S320).

Figure 5:
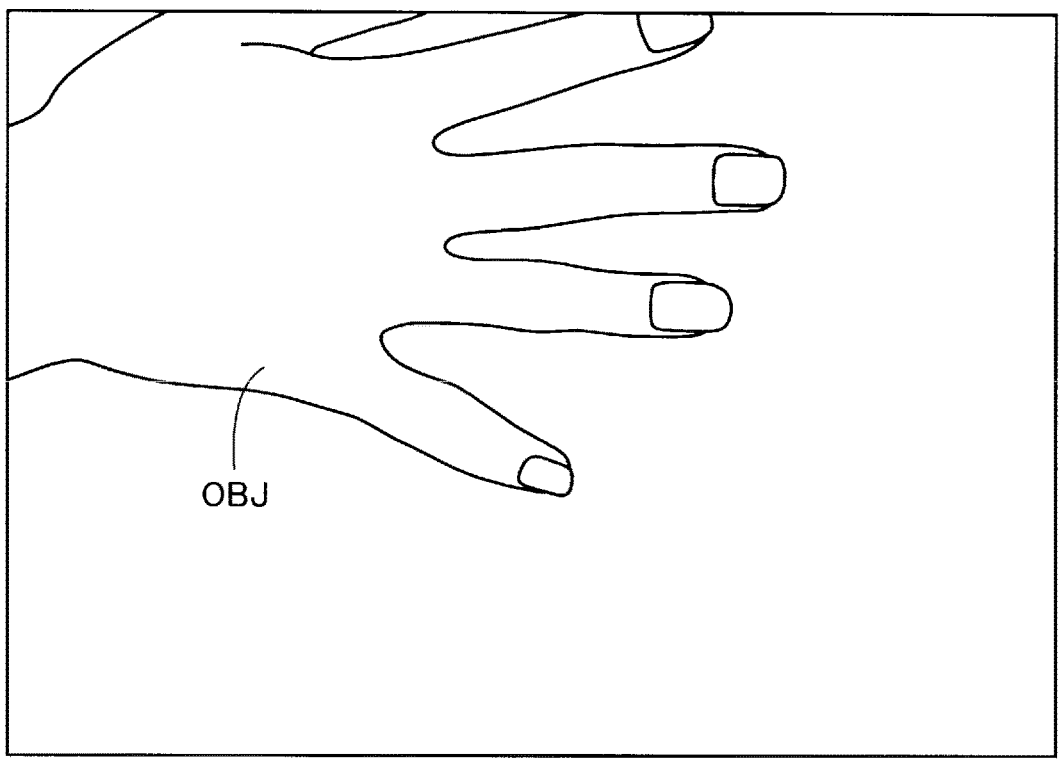
FIG. 5 is an explanatory diagram illustrating an example in which the user is viewing a patient' hand as an outside scene.

FIG. 5 is illustrates a hand OBJ of the patient photographed by the cameras 61R and 61L. When the user's hand OBJ registered in advance is detected, the control device 70 calculates a position including the distance to the hand. The distance to the object and the position on the space of the object can be easily calculated using a parallax of images from the right and left cameras 61R and 61L.

Figure 6:
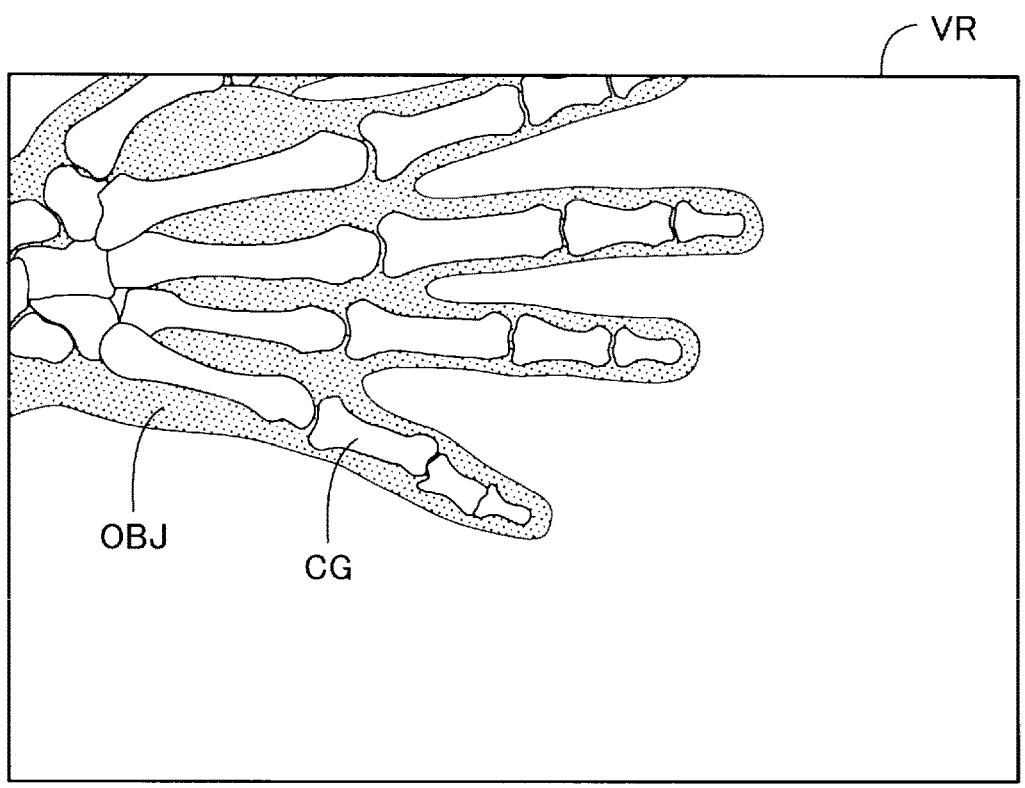
FIG. 6 is an explanatory diagram illustrating an example of a virtual image superimposed and displayed on the patient's hand.

Subsequently, the control device 70 generates computer graphics CG, which is display content linked with the detected object in advance (step S330). In this embodiment, the control device 70 generates computer graphics CG as a virtual image linked with the patient's hand based on an X-ray photograph of the patient's hand registered in advance. Then, the control device 70 displays the generated computer graphics CG on the image display section 20 (step S340). This example is illustrated in FIG. 6. In FIG. 6, an outside scene viewed by the user, that is, a visual field range of the user is illustrated as a sign VR. A virtual image superimposed on the visual field range VR is illustrated as a sign VI. In the visual field range VR, the actual patient's hand OBJ is seen. The computer graphics CG is displayed to be superimposed on the patient's hand OBJ. An image of the computer graphics CG is a virtual image of bones of the fingers of the patient. The image is displayed in the visual field of the user by outputting signals from the right-eye display section 75 and the left-eye display section 76 to the right display unit 22 and the left display unit 24 of the image display section 20. Specifically, images formed on the right and left panels 223 and 243 are guided to the front of the pupils of the user via the right light guide plate 26 and the left light guide plate 28 and recognized by the user via the half mirrors 261 and 281.

A display position of the virtual image is changed according to a movement of the user's head. A relative positional relation with the first object is kept constant. Such update of the display position of the virtual image may be performed by analyzing the images from the cameras 61R and 61L. A signal from the six-axis sensor 66 may be analyzed to recognize a movement of the user's head. The display position may be updated according to the movement of the user's head.

Figure 7:
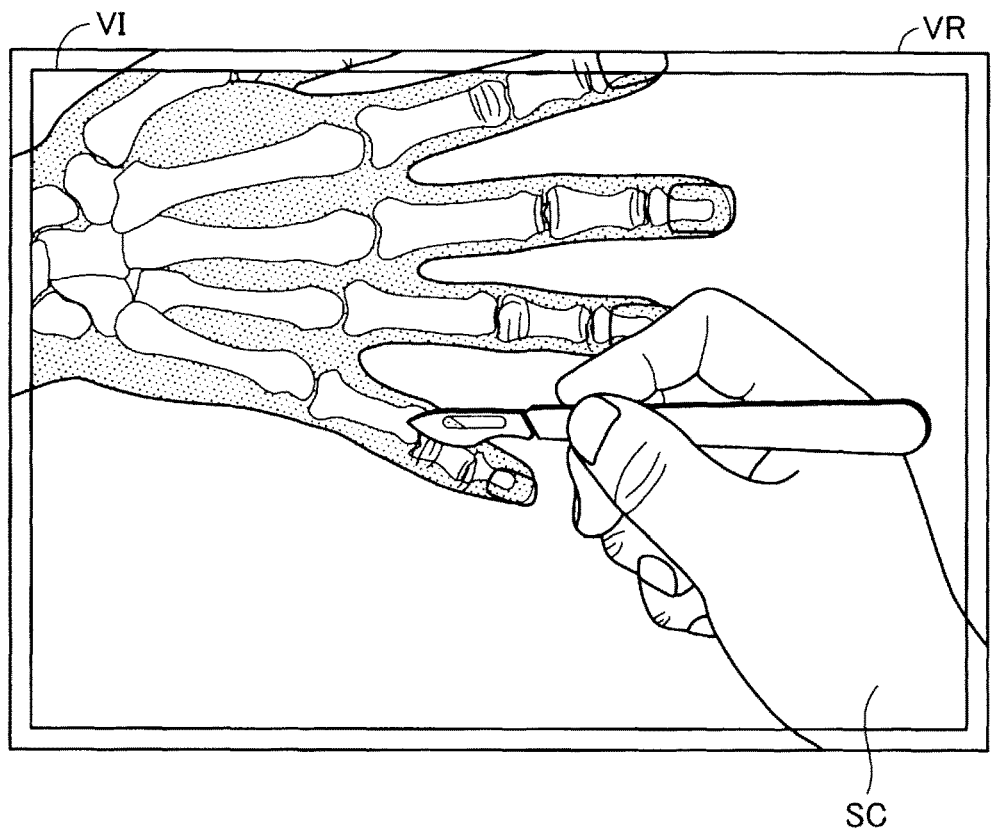
FIG. 7 is an explanatory diagram illustrating an example of appearance at the time when a user's hand comes close to the patient's hand on which the virtual image is superimposed.

In this state, the user recognizes that the image of the bones is superimposed and displayed on the patient's hand. A display form at the time when the surgeon, who is the user, brings a hand holding a surgical knife close to the patient's hand is explained. This state is illustrated in FIG. 7. At this time, the control device 70 sends an instruction to the cameras 61R and 61L and causes the cameras 61R and 61L to photograph the outside scene again (step S350). Then, the control device 70 performs processing for detecting a second object including the user's hand (step S360). The second object is an object that can be operated by the user. The second object may be the user's hand, may be an object such as a surgical knife or a pointing rod, or may be the hand and a thing gripped by the hand integrally grasped as an object. In an example illustrated in FIG. 7, the second object is the user's hand and the surgical knife gripped by the hand. Since the second object is registered in the memory 72 as the hand and the surgical knife gripped by the hand, even if a way of holding the surgical knife is different, the control device can integrally recognize the hand and the surgical knife. Specifically, a color range of the hand and the surgical knife is registered in advance. A continuous range of a region included in the color range is recognized as the second object. Such recognition can be easily realized by labeling or the like. In FIG. 7, the range recognized as the second object is illustrated as a sign SC.

With the hand detection processing (step S360), the control device 70 determines whether the hand is successfully detected (step S362). If the second object including the hand is not successfully detected, the control device 70 returns to step S300 and repeats the processing explained above. If the second object including the hand is successfully detected (YES in step S362), subsequently, the control device 70 determines whether the user's hand and the surgical knife, which are the second object, overlap the patient's hand, which is the object OBJ serving as the first object, detected earlier (step S365). If the user's hand and the surgical knife and the patient's hand do not overlap, the control device 70 returns to step S300 and repeats the processing explained above. The user's hand and the surgical knife and the patient's hand overlapping is equivalent to the first object and the second object being in a first positional relation. The user's hand and the surgical knife and the patient's hand not overlapping is equivalent to the first object and the second object being in a second positional relation.

When determining that the first object and the second object overlap (YES in step S365), the control device 70 performs processing for correcting the computer graphics CG (step 370) and subsequently performs processing for displaying the corrected computer graphics CG on the image display section (step S380). After the series of processing ends, the control device 70 once ends the processing illustrated in FIG. 4. However, the processing illustrated in FIG. 4 is repeated at a predetermined interval as explained above. Therefore, the processing is repeated from step S300 again. The detection of the patient's hand, which is the first object, the specifying of the position of the patient's hand, the detection of the user's hand and the surgical knife, which are the second object, the specifying of the positions of the user's hand and the surgical knife, the generation of the computer graphics CG, and the correction and the display according to the overlap are continuously performed.

Figure 8:
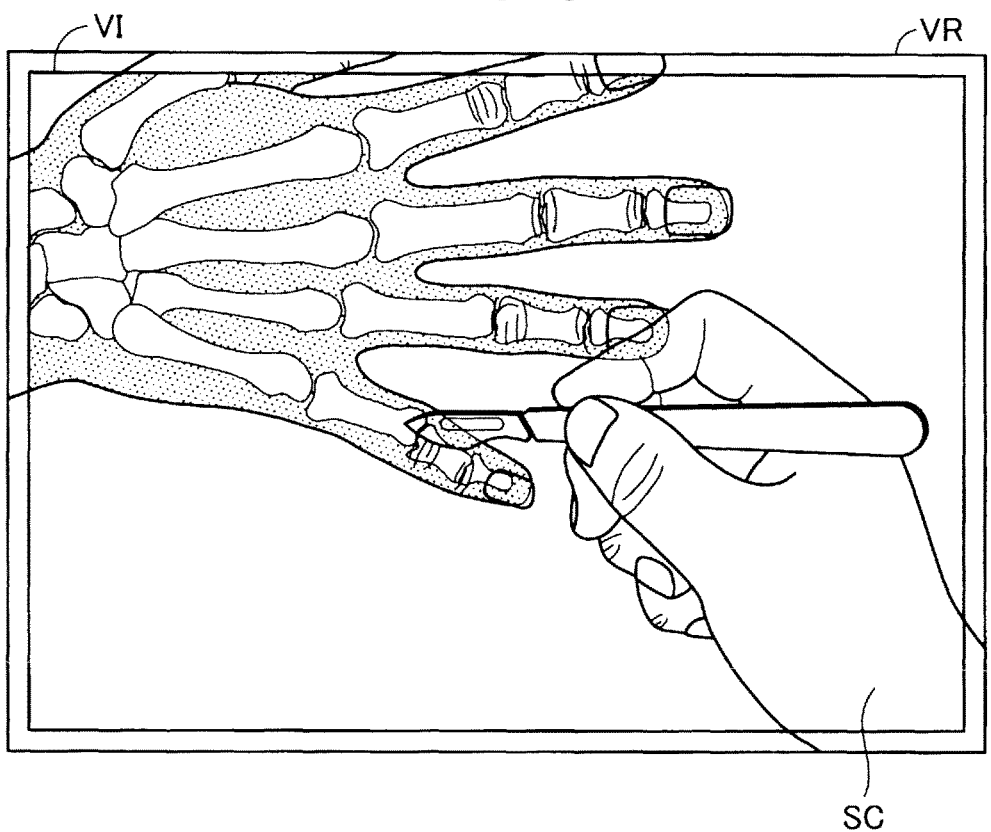
FIG. 8 is an explanatory diagram illustrating a comparative example of the appearance at the time when the user's hand comes close to the patient's hand on which the virtual image is superimposed.

The determination of the overlap of the patient's hand, which is the first object, and the user's hand and the surgical knife, which are the second object, and the correction and the display of the computer graphics CG are explained. As illustrated in FIG. 3, if the processing in steps S365 to S380 illustrated in FIG. 4 is not performed, when viewed from the user, the half mirrors 261 and 281 of the image display section 20 are present and the computer graphics CG is displayed on the nearer side than the outside scene. Therefore, the computer graphics CG is superimposed and displayed on an object present as the outside scene. This state is illustrated in FIG. 8.

Even if the user's hand and the surgical knife come close to the patient's hand and are in a positional relation in which the user's hand and the surgical knife overlap the patient's hand when viewed from the user, the computer graphics CG superimposed and displayed on the patient's hand is superimposed and displayed on the entire outside scene. That is, since the computer graphics CG is superimposed and displayed on the user's hand and the surgical knife as well, a positional relation between the patient's hand and the computer graphics CG and the user's hand and the surgical knife viewed from the user could be different from originally assumed appearance. An X-ray video of the bones of the patient's hand displayed as the computer graphics CG displays a state of the bones originally invisible from the outside of the patient's hand and assists a surgical operation. A presence position of the X-ray video is assumed to be the inside of the patient's hand. Nevertheless, as illustrated in FIG. 8, since the computer graphics CG is displayed on the half mirrors 261 and 281 of the image display section 20, the computer graphics CG is displayed to overlap the user's hand as well.

On the other hand, in this embodiment, the control device 70 determines the overlap of the patient's hand, which is the first object, and the user's hand, the surgical knife, and the like, which are the second object, (step S365) and, when the patient's hand and the user's hand, the surgical knife, and the like overlap, corrects the computer graphics CG (step S370) and displays the computer graphics CG (step S380). As a result, instead of the display illustrated in FIG. 8, as illustrated in FIG. 7, the computer graphics CG overlapping the second object present on the near side of the overlap is corrected. The computer graphics CG in the portion of the user's hand and the surgical knife, which are the second object, is deleted. Therefore, when viewed from the user, the user's hand and the surgical knife are displayed on the nearest side, the patient's hand, which is the first object, and the X-ray photograph of the bones, which is a virtual image superimposed on the patient's hand, are displayed behind the user's hand and the surgical knife. In the first embodiment, in which way, display without discomfort is realized when viewed from the user.

A-4. Other Display Forms of the Virtual Image

Figure 9A:
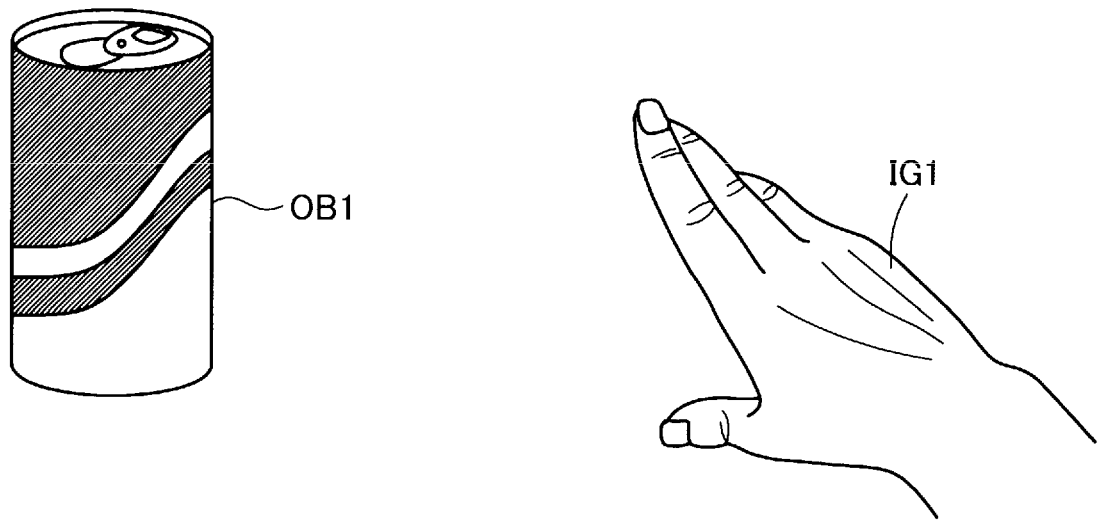
FIG. 9A is an explanatory diagram illustrating a positional relation between a first object and a second object.
Figure 9B:
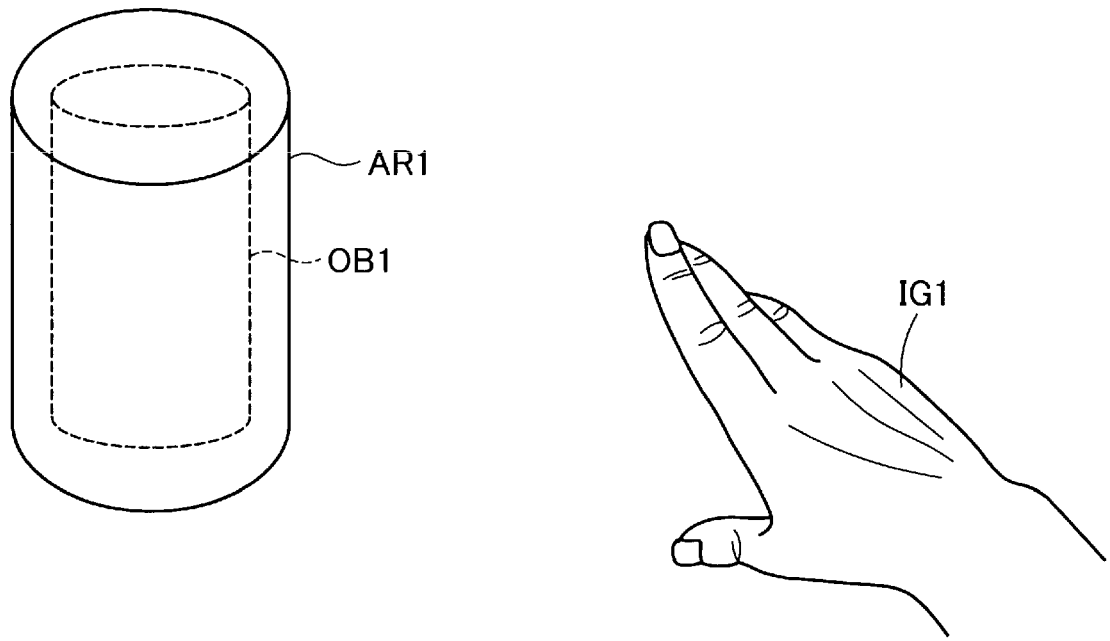
FIG. 9B is an explanatory diagram illustrating appearance at the time when a virtual image is superimposed on the first object.

Various measures are possible other than the embodiment to change the display form of the virtual image from the overlapping positional relation between the first object and the second object operable by the user. Forms of display by the measures are explained with reference to examples illustrated in FIGS. 9A and 9B and subsequent figures. FIG. 9A illustrates a state in which a can OB1 of drinking water, which is the first object, and a user's hand IG1, which is the second object, are apart. At this time, the HMD 100 recognizes the first object from images captured by the cameras 61R and 61L. As illustrated in FIG. 9B, the HMD 100 superimposes and displays a virtual image AR1 on the can OB1.

Figure 10:
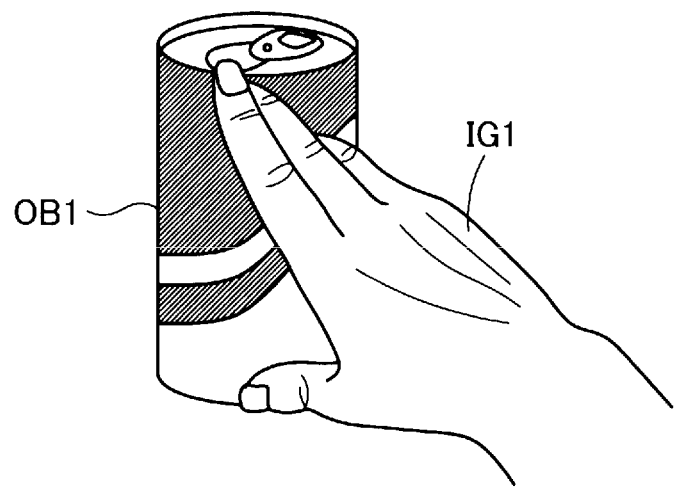
FIG. 10 is an explanatory diagram illustrating a first positional relation between the first object and the second object.
Figure 11A:
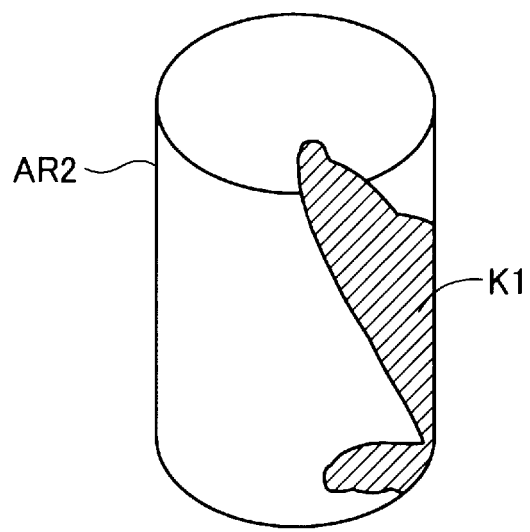
FIG. 11A is an explanatory diagram illustrating a state in which the second object overlapping the virtual image is removed from the virtual image.

It is assumed that, from this state, the user's hand IG1 comes close to the can OB1, which is the first object, and, as illustrated in FIG. 10, the user's hand IG1 and the can OB1 overlap and the hand IG1 is present on the near side. At this time, as in the first embodiment, as illustrated in FIG. 11A, the virtual image AR1 is corrected to a virtual image AR2 shaved off in the shape of the hand IG1, which is the second object. In this way, a part of the virtual image AR1 is hidden by the hand IG1, which is the second object. It is seen as if the virtual image AR1 have changed to the virtual image AR2. As a result, the user's hand IG1 is visually recognized as if the user's hand IG1 is present on the virtual image AR1.

Figure 12:
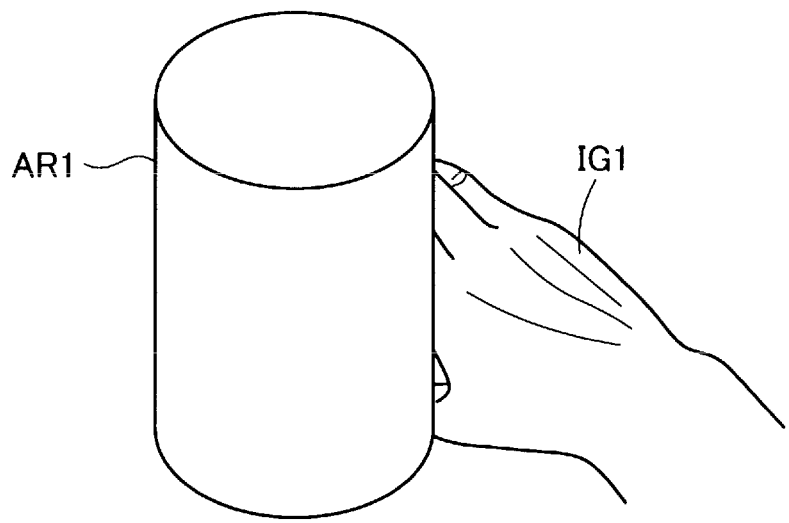
FIG. 12 is an explanatory diagram illustrating a state in which the second object is hidden by the virtual image.

On the other hand, if such correction of the virtual image AR1 is not performed, as illustrated in FIG. 12, the user's hand IG1 is hidden by the virtual image AR1. It is seen as if the user's hand IG1 is present on the other side of the first object OB1. Therefore, by correcting the virtual image according to the overlap of the two objects, in this case, it is possible to realize display corresponding to actual overlap of the objects.

Figure 11B:
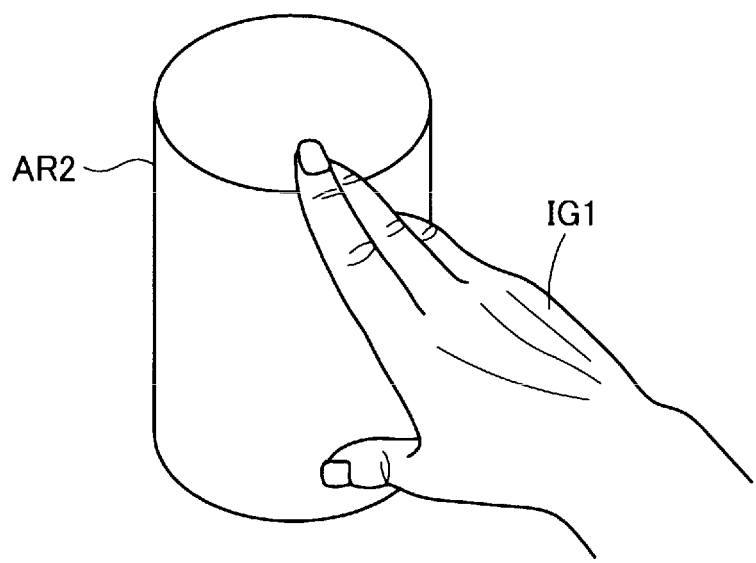
FIG. 11B is an explanatory diagram illustrating appearance at the time when the second object is superimposed on the virtual image illustrated in FIG. 11A.

In contrast, if the user's hand IG1 is present on the other side of the can OB1, which is the first object, the display illustrated in FIG. 12 is display without discomfort when viewed from the user. In this case, it is unnecessary to change the display form of the virtual image AR1. On the other hand, as another form, it is also possible that display illustrated in FIG. 11B is performed if the user's hand IG1 is present on the other side of the can OB1, which is the first object, and display illustrated in FIG. 12 is performed if the user's hand IG1 is present on the near side of the can OB1, which is the first object. In this case, the user can enjoy an experience of appearance different from a reality, so to speak, an experience in a different dimension. Therefore, when the overlapping positional relation viewed from the user between the can OB1, which is the first object, and the hand IG1, which is the second object, is the first positional relation, by differentiating the display form of the virtual image from a display form of the virtual image at the time when the positional relation is the second positional relation different from the first positional relation, it is possible to realize one of natural display (without discomfort or with less discomfort) viewed from the user and display with which the user can experience appearance different from the reality. The former is suitable for supporting work such as a surgical operation and repair in which a virtual image is used and the latter can be used for a game and the like.

Figure 13:
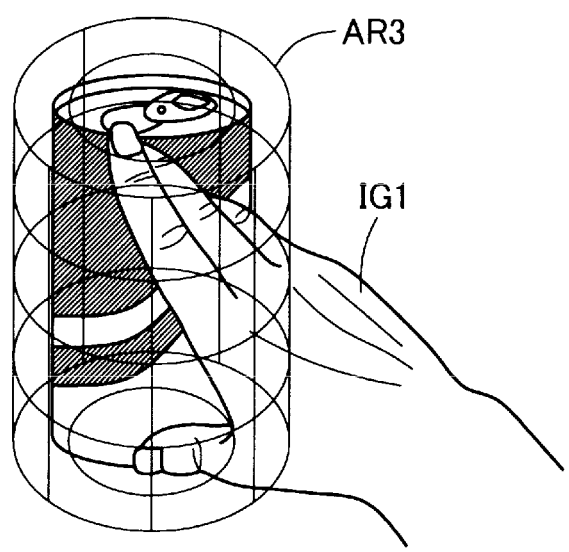
FIG. 13 is an explanatory diagram illustrating appearance at the time when the virtual image is a wire frame.

Another form of differentiating the display form of the virtual image is explained. For example, when the second object overlaps the first object, as illustrated in FIG. 13, the virtual image may be an image AR3 of a wire frame. If the virtual image is the wire frame, the first object can be visually recognized. Even if the wire frame is displayed further on the user side than the user's hand IG1, which is the second object, display without discomfort is performed. At this time, the wire frame in a position overlapping the user's hand, which is the second object, may be erased.

Figure 14:
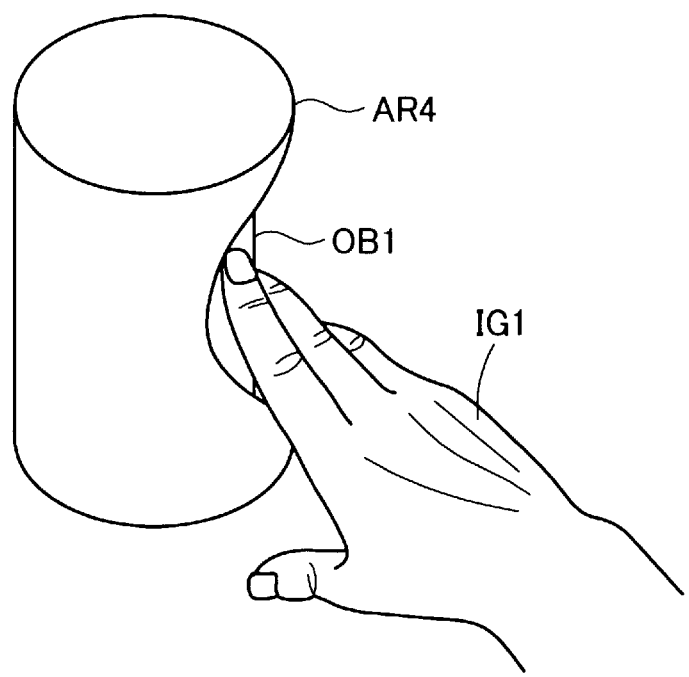
FIG. 14 is an explanatory diagram illustrating appearance at the time when the virtual image is deformed.

Alternatively, as illustrated in FIG. 14, when the user's hand IG1, which is the second object, comes close to the virtual image, the virtual image may be deformed and displayed as an image AR4 not overlapping the second object. In this case, when the virtual image is deformed, the first object OB1 present behind the virtual image is seen. Display with less discomfort is performed when viewed from the user.

Figure 15:
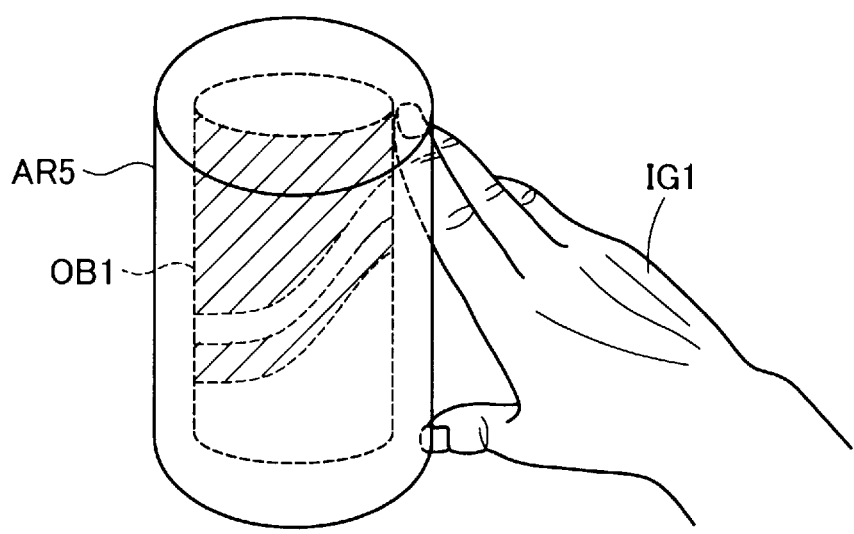
FIG. 15 is an explanatory diagram illustrating appearance at the time when the virtual image is displayed thin.

Further, as illustrated in FIG. 15, when the user's hand, which is the second object, comes close to the virtual image, the display of the virtual image may be thinned and displayed as an image AR5 through which the second object is seen. In this case, since the virtual image is displayed thin, the first object OB1 present behind the virtual image is also seen through and the user's hand IG1, which is the second object, is also seen through. Therefore, display with less discomfort is performed when viewed from the user.

All of the display examples illustrated in FIGS. 13 to 15 are display without discomfort or less discomfort when viewed from the user. Conversely, when the first object and the second object do not overlap, a wire frame may be displayed and, when the first object and the second object overlap, solid display illustrated in FIG. 9B may be performed. In the examples illustrated in FIGS. 14 and 15, similarly, the display form at the time when the first object and the second object do not overlap and the display form at the time when the first object and the second object overlap may be reversed. In this case, for the user, display with discomfort is performed. The user can enjoy a visual experience in a different dimension. Such display may be performed in a game and the like.

The HMD 100 can also be used for assembly, repair, and the like of a product. In such a case, a plurality of components of a product being assembled or a product to be repaired are seen in an outside scene. A virtual image is superimposed on the plurality of components to guide assembly work or guide repair. Even in such a case, when a user's hand, a tool, or the like comes close to the virtual image, a positional relation between a component, which is the first object, and the user's hand or the tool, which is the second object, is determined. By differentiating a display form of the virtual image in a first positional relation in which the component and the user's hand or the tool overlap and a second positional relation in which the component and the user's hand or the tool do not overlap, it is possible to reduce discomfort in appearance viewed from the user.

B. Second Embodiment

Figure 16:
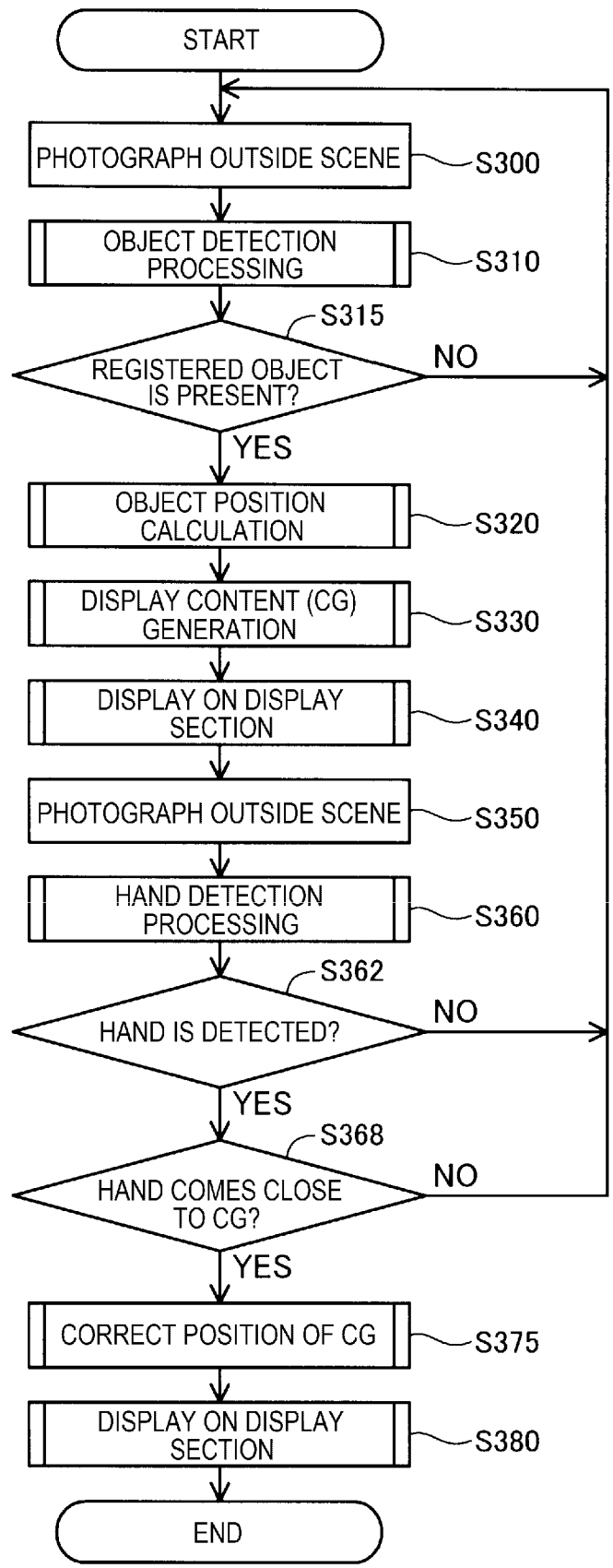
FIG. 16 is a flowchart illustrating an overview of display processing in a second embodiment.
Figure 17:
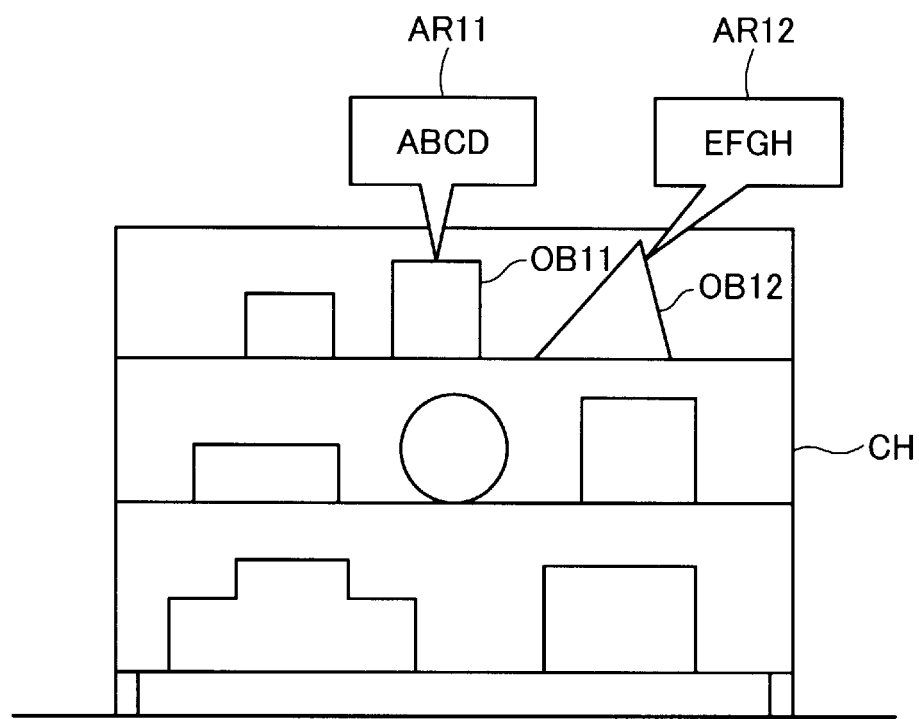
FIG. 17 is an explanatory diagram illustrating an example of appearance of a virtual image in the second embodiment.

A second embodiment is explained. The HMD 100 in the second embodiment has the same hardware configuration as the hardware configuration of the HMD 100 in the first embodiment. Only processing performed by the HMD 100 in the second embodiment is different from the processing performed by the HMD 100 in the first embodiment. In the HMD 100 in the second embodiment, a part of processing performed by the control device 70 is different from the processing illustrated in FIG. 4. The control device 70 in the second embodiment executes processing illustrated in FIG. 16. This processing is the same as the processing illustrated in FIG. 4 in steps S300 to S362. However, as illustrated in FIG. 17, an outside scene photographed in step S300 includes a shelf CH and a plurality of components equivalent to a first object placed on the shelf. The display content generated in step S330, that is, the virtual image linked with the first object is, in the second embodiment, an explanatory note concerning a component. The computer graphics CG of displayed explanatory notes generated in step S330 is illustrated as signs AR11 and AR12 in FIG. 17.

The control device 70 performs the processing in steps S300 to S360 and then determines whether the user's hand IG1 is detected (step S362). When detecting the user's hand IG1, the control device 70 determines whether the computer graphics CG, which is the virtual image, and the user's hand, which is the second object, are in a first positional relation, that is, close to each other at a predetermined distance or less (step S368). The second embodiment is different from the first embodiment in that a target of determination of a positional relation with the user's hand, which is the second object, is not the first object and is the computer graphics CG, which is the virtual image.

If the computer graphics CG and the user's hand are not close to each other at the predetermined distance or less, the control device 70 returns to step S300 and repeats the processing. When determining that the user's hand is close to the computer graphics CG at the predetermined distance or less and the user's hand and the computer graphics CG are about to overlap (YES in step S368), the control device 70 corrects a display position of the computer graphics CG (step S375) and displays the computer graphics CG in the corrected display position using the image display section 20 (step S380). After the processing explained above, the control device 70 once ends this processing routine.

An example of display in the second embodiment is explained. FIG. 17 is an example of an outside scene that the user is viewing in the second embodiment. In this example, several components are placed on the shelf CH. Among the components, a component OB11 and a component OB12 are first objects registered in advance. If the registered first objects are present in an outside scene imaged by the cameras 61R and 61L (steps S300 to S315), the control device 70 recognizes the first objects and generates the virtual images AR11 and AR12, that is, texts concerning the components OB11 and OB12 as the computer graphics CG and displays the virtual images AR11 and AR12 near the components OB11 and OB12, which are the first objects (steps S320 to S340). FIG. 17 is a display example in the case in which the user's hand IG1 is present in a place farther than a predetermined distance from the virtual images AR11 and AR12.

Figure 18:
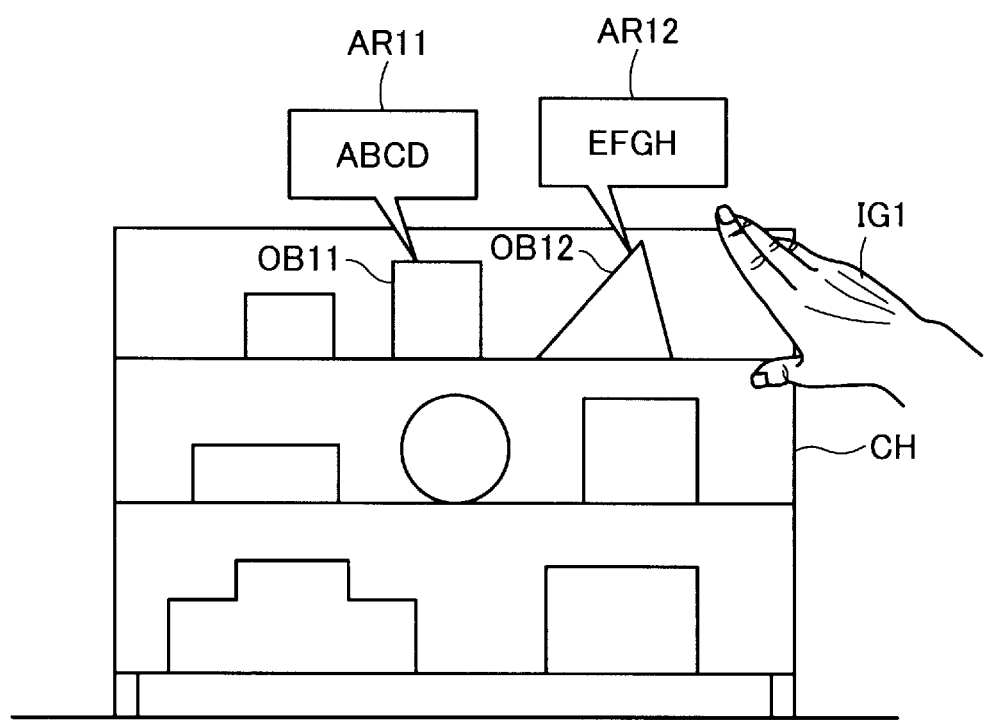
FIG. 18 is an explanatory diagram illustrating an example of appearance at the time when display of the virtual image in the second embodiment is corrected.

When the user stretches the hand to the shelf CH and the hand IG1 comes close to the virtual images AR11 and AR12 in this state, the control device 70 detects the user's hand IG1, which is the second object, calculates a position of the user's hand IG1, and detects whether the user's hand IG1 is close to the virtual images AR11 and AR12 at the predetermined distance or less (steps S350 to S368). When determining that the user's hand IG1 is close to the virtual images AR11 and AR12 at the predetermined distance or less, the control device 70 corrects display positions of the virtual images AR11 and AR12 (step S375) and changes display positions of the virtual images AR11 and AR12. This state is illustrated as FIG. 18. "Close to" in this case means closeness of overlap of the user's hand IG1 and the virtual images AR11 and AR12 viewed from the user and, therefore, does not mean a three-dimensional distance and means a distance in a plan view from the user. Accordingly, the cameras are capable of also determining "whether the user's hand IG1 is close to the virtual images AR11 and AR12" based on an image of a monocular camera.

In the second embodiment, in this way, when the hand of the user using the HMD 100 comes close to the images AR11 and AR12 virtually displayed by the HMD 100, the display positions of the images AR11 and AR12 are changed in advance to prevent the user's hand IG1 from overlapping the computer graphics CG. Therefore, it is possible to avoid a situation in which the user's hand IG1 is hidden by the virtual images AR11 and AR12 and display with discomfort is performed. In a display example illustrated in FIG. 18, the virtual image AR11 displayed for the component OB11 is not always close to the user's hand IG1. However, according to correction of a display position of the virtual image AR12, which is likely to come close to and overlap the user's hand IG1, a display position of the virtual image AR11 is corrected to prevent the virtual image AR11 from overlapping the virtual image AR12. It goes without saying that the display position of only the virtual image AR12, to which the user's hand IG1 is close at the predetermined distance or less, may be corrected to prevent the virtual image AR12 from overlapping not only the user's hand IG1 but also the other virtual image AR11.

In the embodiment explained above, the virtual images AR11 and AR12 are the explanatory notes for the component OB11 and the like. However, virtual images do not need to be limited to such explanatory notes and may be images that apparently expand the first objects. For example, a first object registered in advance may be a specific individual and virtual images may be a flag, a sword, or the like held by the specific individual. When a user's hand comes close to the flag and the sword, which are the virtual images, display positions of the virtual images may be corrected to be away from the hand. Such correction of the display positions can be used in a game and the like. When the virtual images and the second object are in the first positional relation, the display positions of the virtual images only have to be corrected to be different from display positions at the time when the virtual images and the second object are in the second positional direction. The display positions may be corrected to bring the virtual images close to the second object. In this case, when the second object comes close to the virtual images, the display positions of the virtual images are changed such that the virtual images adhere to the second object.

C. Other Embodiments

In the embodiments explained above, the position of the object is calculated using the images from the cameras 61R and 61L. However, instead of the cameras 61R and 61L, the position and the distance of the object may be calculated, or derived, using other sensors. For instance, when a tag or the like is embedded in the object, the position and the distance of the object may be calculated using the strength of a radio wave from the tag. If it is known in advance that the object is present in a predetermined place, a GSNN receiving device may be provided in the control device 70. The position and the distance of the object may be calculated as differences between the latitude, the longitude, and the altitude of the HMD 100 and the latitude, the longitude, and the altitude of the object, the position of which is known in advance. Alternatively, a distance measurement sensor, which detects the distance to a measurement target object located in a measurement direction set in advance, may be provided in the HMD 100 to measure the distances to the first object and the second object. The distance measurement sensor can be configured by, for example, a light emitting section such as an LED or a laser diode and a light receiving section configured to receive reflected light of light emitted from a light source and reflected on the measurement target object. In this case, a distance is calculated by triangulation processing or distance measurement processing based on a time difference. The distance measurement sensor may be configured by, for example, a transmitting section configured to emit ultrasound and a receiving section configured to receive the ultrasound reflected on the measurement target object. In this case, a distance is calculated by distance measurement processing based on a time difference.

Embodiments explained below are also possible besides the various embodiments explained above.

(1) As one aspect, it is possible to assume a display device that displays an image in a visual field of a user who is capable of visually recognizing an outside scene, the display device including: a first detecting section configured to detect a first object present in the visual field of the user together with a position of the first object; a second detecting section configured to detect a second object operable by the user together with a position of the second object; and a display changing section configured to superimpose and display, on the first object, a virtual image linked with the first object in advance and, when an overlapping positional relation viewed from the user between the first object and the second object is a first positional relation, differentiate a display form of the virtual image from a display from in a second positional relation different from the first positional relation.

Consequently, it is possible to differentiate the display form of the virtual image according to whether the overlapping positional relation between the first object and the second object is the first positional relation or the second positional relation. Therefore, it is possible to flexibly display the first object, the second object, and the virtual image according to the overlapping positional relation between the first object and the second object. The display form of the virtual image in the first positional relation and the display form of the virtual image in the second positional relation only have to be different. For example, the first positional relation may be a positional relation at the time when the second object is present further on the user side than the first object. The second positional relation may be a positional relation at the time when the second object is not present further on the user side than the first object. In this case, in the first positional relation, as the display forms, the second object may be displayed as being present further on the user side than the virtual image and, in the second positional relation, the virtual image may be displayed as being present further on the user side than the second object. However, the first and second positional relations and the display forms may be reversed. The former is close to natural display when viewed from the user. However, an experience of appearance different from a reality, so to speak, an experience in a different dimension may be provided to the user by the latter display. This disclosed aspect can also be implemented as a display method.

(2) In such a display device, the first positional relation may be a positional relation in which the second object is present further on the user side than the first object and at least a part of the second object overlaps the first object when viewed from the user. Consequently, it is possible to detect a positional relation in which the second object is present further on the near side than the first object when viewed from the user and display the virtual image according to the detected positional relation. In this case as well, association between the first and second positional relations and the display form can be variously set. For example, the display form may be changed between when at least a part of the second object overlaps the first object when viewed from the user and when a part of the second object does not overlap the first object when viewed from the user. The display form may be a form close to real appearance when viewed from the user or may be appearance different from a reality.

(3) In such a display device, the display form in the first positional relation may be a form in which the virtual display is performed avoiding at least the part of the second object. Consequently, since the virtual image is displayed to avoid at least the part of the second object overlapping the first object on the user side, it is possible to easily recognize that at least the part of the second object is present further on the user side than the virtual image and the first object.

(4) In such a display device, the display form in the first positional relation may be a form in which at least the part of the second object is transmitted through the virtual display and displayed to be able to be visually recognized. Consequently, when the second object overlaps the first object, since at least the part of the second object can be visually recognized through the virtual display, it is possible to easily recognize that at least the part of the second object is present further on the user side than the virtual image and the first object. When at least the part of the second object is "transmitted" through the virtual display and displayed, the virtual display may be displayed thin to enable the second object to be seen through the virtual display. The virtual display may be formed as a wire frame or the like to enable the second object to be seen.

(5) Another aspect of the present disclosure may be a display device that displays an image in a visual field of a user who is capable of visually recognizing an outside scene, the display device including: a first detecting section configured to detect a first object present in the visual field of the user together with a position of the first object; a second detecting section configured to detect a second object operable by the user together with a position of the second object; and a display changing section configured to display, with respect to the first object, in a predetermined display position, a virtual image linked with the first object in advance and, when a positional relation viewed from the user between the display position where the virtual image is displayed and the second object is a first positional relation, differentiate the display position of the virtual image from a display position in a second positional relation different from the first positional relation.

Consequently, it is possible to differentiate the display position of the virtual image according to whether the positional relation viewed from the user between the display position of the virtual image and the second object is the first positional relation or the second positional relation. Therefore, it is possible to flexibly change the display position of the virtual image according to the difference in the positional relation between the display position of the virtual image and the second object. The display position of the virtual image in the first positional relation and the display position of the virtual image in the second positional relation only have to be different. For example, the first positional relation may be a positional relation at the time when the second object is away from the display position of the virtual image when viewed from the user. The second positional relation may be a positional relation at the time when the second object comes close to or overlap the display position of the virtual image. At this time, in the first positional relation, the virtual image may be displayed in a predetermined position with respect to the first object and, in the second positional relation, the virtual image may be displayed in a position where the virtual image does not interfere with the second object. It goes without saying that the first and second positional relations and the display positions may be reversed. The former is display in which the second object and the virtual image do not interfere when viewed from the user. However, by displaying the virtual image in a display position where the second object and the virtual image interfere, an experience of appearance seen as if the virtual image clings to the second object operated by the user may be provided to the user. This disclosed aspect can also be implemented as a display method.

(6) In such a display device, the second detecting section may detect, as the second object, at least one of a part of a human body and an object registered in advance operated by a person. Consequently, it is possible to detect a hand or a foot of the user or fingers of the hand or the foot and treat the hand or the foot or the fingers as the second object. It is possible to appropriately display a pointing rod, a cookware such as a ladle or a spatula, a writing instrument such as a pencil or a brush, a tool such as a screwdriver, or the like held by the hand or the foot of the user or the fingers of the hand or the foot and the virtual image. The human body may be a human body of a person other than the user of the display device. The human body can be easily recognized by a color including a hue of skin and the area of the color, a marker stuck to the human body, or the like. A person other than the user may operate the object. In this case, the object only has to be registered in advance by a marker, a tag, RFID, or the like.

(7) The display device may be a head-mounted display device. Consequently, it is possible to move the virtual image according to a change of the user's head, that is, the visual field and cause the display device to naturally display, in the outside scene, the virtual image linked with the first object in the outside scene. The display device is not limited to the head-mounted display device and may be a hand-held display device, a monocular display device, or the like if the display device can display the virtual image over the outside scene. The display device may be a display device that displays the virtual image on a windshield or the like in a vehicle such as an automobile or a ship. In this case, the second object may be a part of a vehicle body or a ship hull. If the vehicle is a heavy machine such as a hook-and-ladder truck or a power shovel, the second object may be an operable structure such as a ladder or a shovel.

(8) In the embodiments, a part of the components realized by hardware may be replaced with software. At least a part of the components realized by software can also be realized by discrete hardware circuit components. When a part or all of the functions of the present disclosure are realized by software, the software (a computer program) can be provided in a form stored in a computer-readable recording medium. The "computer-readable recording medium" is not limited to a portable recording medium such as a flexible disk or a CD-ROM and includes various internal storage devices in a computer such as a RAM and a ROM and external storage devices fixed to the computer such as a hard disk. That is, the "computer-readable recording medium" has a broad meaning including any recording medium that can record a data packet not temporarily but fixedly.

The present disclosure is not limited to the embodiments explained above and can be realized in various configurations without departing from the gist of the present disclosure. For example, the technical features in the embodiments corresponding to the technical features in the aspects described in the summary can be substituted or combined as appropriate in order to solve a part or all of the problems described above or achieve a part of all of the effects described above. Unless the technical features are explained as essential technical features in this specification, the technical features can be deleted as appropriate.

What is claimed is:
1. A display device comprising:
   a display that displays an image in a visual field of a user;
   a camera; and
   one or more processors or hardware circuits configured to:

detect, using the camera, a first object present in the visual field of the user together with a position of the first object;

detect, using the camera, a second object operable by the user together with a position of the second object; and cause the display to superimpose and display, on the first object, a virtual image linked with the first object in advance and, when an overlapping positional relation viewed from the user between the first object and the second object is a first positional relation, differentiate a display form of the virtual image from a display form in a second positional relation different from the first positional relation.

2. The display device according to claim 1, wherein the first positional relation is a positional relation in which the second object is present further on the user side than the first object and at least a part of the second object overlaps the first object when viewed from the user.

3. The display device according to claim 2, wherein the display form in the first positional relation is a form in which the virtual display is performed avoiding at least the part of the second object.

4. The display device according to claim 2, wherein the display form in the first positional relation is a form in which at least the part of the second object is transmitted through the virtual display and displayed to be able to be visually recognized.

5. A display device comprising:

a display that displays an image in a visual field of a user;

a camera; and one or more processors or hardware circuits configured to:

detect, using the camera, a first object present in the visual field of the user together with a position of the first object;

detect, using the camera, a second object operable by the user together with a position of the second object; and cause the display to display, with respect to the first object, in a predetermined display position, a virtual image linked with the first object in advance and, when a positional relation viewed from the user between the display position where the virtual image is displayed and the second object is a first positional relation, differentiate the display position of the virtual image from a display position in a second positional relation different from the first positional relation.

6. The display device according to claim 1, wherein the camera detects, as the second object, at least one of a part of a human body and an object registered in advance operated by a person.

7. The display device according to claim 1, wherein the display device is a head-mounted display device.

8. A method for displaying an image in a visual field of a user, the display method comprising:

detecting a first object present in the visual field of the user together with a position of the first object;

displaying a virtual image linked with the first object together with the first object;

detecting a second object operable by the user together with a position of the second object; and when an overlapping positional relation viewed from the user between the first object and the second object is a first positional relation, differentiating a display form of the virtual image from a display form in a second positional relation different from the first positional relation.

9. A method for displaying an image in a visual field of a user, the display method comprising:

detecting a first object present in the visual field of the user together with a position of the first object;

displaying a virtual image linked with the first object in a predetermined position with respect to the first object;

detecting a second object operable by the user together with a position of the second object; and when a positional relation viewed from the user between the display position where the virtual image is displayed and the second object is a first positional relation, differentiating the display position of the virtual image from a display position in a second positional relation different from the first positional relation.

* * * * *